US012646443B2

(12) United States Patent
Kuang et al.

(10) Patent No.: US 12,646,443 B2
(45) Date of Patent: Jun. 2, 2026

(54) DISPLAY PANEL AND DISPLAY APPARATUS

(71) Applicant: XIAMEN TIANMA DISPLAY TECHNOLOGY CO., LTD., Xiamen (CN)

(72) Inventors: Jian Kuang, Xiamen (CN); Qingxia Wang, Shanghai (CN); Xingyao Zhou, Xiamen (CN); Yana Gao, Xiamen (CN); Gaojun Huang, Shanghai (CN); Mengmeng Zhang, Shanghai (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/676,519

(22) Filed: May 29, 2024

(65) Prior Publication Data

US 2024/0312401 A1 Sep. 19, 2024

(30) Foreign Application Priority Data

Dec. 25, 2023 (CN) ........................ 202311797336.0

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/0297* (2013.01)

(58) Field of Classification Search
CPC ............ G09G 3/32; G09G 2310/0267; G09G 2310/0275; G09G 2310/0297; G09G 3/20; G09F 9/30; H10D 86/40; H10D 86/60; H10H 29/142; H10K 59/131; H10K 59/80; H10K 59/82
See application file for complete search history.

(56) References Cited

U.S. PATENT DOCUMENTS

| | | | | |
|---|---|---|---|---|
| 9,276,055 | B1 * | 3/2016 | Son | H10K 59/8791 |
| 10,037,726 | B2 * | 7/2018 | Lee | G09G 3/2003 |
| 2015/0294985 | A1 * | 10/2015 | Hekstra | H10D 89/931 257/773 |
| 2016/0055789 | A1 * | 2/2016 | Hashimoto | G09G 3/3648 345/204 |
| 2018/0047804 | A1 * | 2/2018 | Zhou | G09G 3/2092 |
| 2019/0164460 | A1 * | 5/2019 | Liu | G09G 3/006 |
| 2019/0251902 | A1 * | 8/2019 | Qian | G09G 3/3291 |
| 2020/0320937 | A1 * | 10/2020 | Yang | G09G 3/3258 |
| 2021/0020135 | A1 * | 1/2021 | Yang | G11C 7/1057 |
| 2022/0059635 | A1 * | 2/2022 | Liu | H10K 59/1213 |
| 2023/0389389 | A1 * | 11/2023 | Bang | G06F 3/0446 |
| 2025/0133926 | A1 * | 4/2025 | Choi | H10K 59/131 |

FOREIGN PATENT DOCUMENTS

| | | |
|---|---|---|
| CN | 109031828 A | 12/2018 |

* cited by examiner

*Primary Examiner* — Amy Onyekaba
(74) *Attorney, Agent, or Firm* — KILPATRICK TOWNSEND & STOCKTON LLP

(57) ABSTRACT

A display panel and a display apparatus are provided according to the present disclosure. First multiplexers are arranged on a second side of an active area. Less wiring is arranged in a chip bonding area in a border area, and therefore wires can be easily arranged in the chip bonding area in the border area, facilitating a narrow border of the display apparatus.

27 Claims, 17 Drawing Sheets

DISPLAY PANEL AND DISPLAY APPARATUS

The present application claims priority to Chinese Patent Application No. 202311797336.0, titled "DISPLAY PANEL AND DISPLAY APPARATUS", filed on Dec. 25, 2023 with the China National Intellectual Property Administration, which is incorporated herein by reference in its entirety.

FIELD

The present disclosure relates to the field of displays, and in particular to a display panel and a display apparatus.

BACKGROUND

With the development of display technology, display apparatuses have been applied in various fields. The display apparatus includes an active area and a border area. The border area includes a step area for arranging a drive chip. Data wires in the display area are electrically connected to a corresponding circuit at the step area. However, wiring including the data wires at the step area of the display apparatus is increasing to conform to increasingly high resolution of the display apparatus, increasing difficulties in arranging wires and further resulting in a wide border at the step area.

SUMMARY

In view of the above, a display panel and a display apparatus are provided according to the present disclosure, to effectively solve the problems existing in the conventional technology. Less wiring is arranged in a chip bonding area in the border area, and therefore the wires can be easily arranged in the chip bonding area in the border area, facilitating a narrow border of the display apparatus.

The following embodiments are provided according to the present disclosure.

A display panel includes an active area and a border area. The border area includes a chip bonding area on a first side of the active area along a first direction. Multiple data pins are arranged in the chip bonding area. Multiple multiplexers are arranged in the border area. The multiple multiplexers include at least first multiplexers arranged on a second side of the active area. The first side of the active area is opposite to the second side of the active area. Input terminals of the first multiplexers are electrically connected to first data input wires, and the first data input wires are electrically connected to the data pins through the active area, respectively.

A display apparatus is provided according to the present disclosure. the display apparatus includes a display panel. The display panel includes an active area and a border area. The border area includes a chip bonding area on a first side of the active area along a first direction. Multiple data pins are arranged in the chip bonding area. Multiple multiplexers are arranged in the border area. The multiple multiplexers include at least first multiplexers arranged on a second side of the active area. The first side of the active area is opposite to the second side of the active area. Input terminals of the first multiplexers are electrically connected to first data input wires, and the first data input wires are electrically connected to the data pins through the active area, respectively.

BRIEF DESCRIPTION OF THE DRAWINGS

For more clearly illustrating embodiments of the present disclosure, the drawings for describing the embodiments will be briefly described hereinafter. Apparently, the drawings in the following description show only some embodiments of the present disclosure.

DETAILED DESCRIPTION

Embodiments of the present disclosure are clearly and completely described hereinafter in conjunction with the drawings of the embodiments of the present disclosure. Apparently, the embodiments described in the following are only some rather than all of the embodiments of the present disclosure.

Various modifications and changes to the present disclosure without departing from the embodiments of the present disclosure. Therefore, the present disclosure is intended to cover modifications and changes of the present disclosure, which fall within the scope of the appended claims (the claimed embodiments) and their equivalents. It should be noted that the implementations provided in the embodiments of the present disclosure may be combined with each other in case of no conflict.

As described in the BACKGROUND part, with the development of display technology, display apparatuses are applied in various fields. The display apparatus includes an active area and a border area. The border area includes a step area for arranging a drive chip. Data wires in the display area are electrically connected to a corresponding circuit at the step area. However, wiring including the data wires at the step area of the display apparatus is increasing to conform to increasingly high resolution of the display apparatus, increasing difficulties in arranging wires and further resulting in a wide border at the step area.

In view of this, a display panel and a display apparatus are provided according to embodiments of the present disclosure, to effectively solve the problems existing in the conventional technology. Less wiring is arranged in a chip bonding area in the border area, and therefore the wires can be easily arranged in the chip bonding area in the border area, facilitating a narrow border of the display apparatus.

The embodiments of the present disclosure are described in detail in conjunction with FIGS. 1 to 18. It should be noted that, due to the limited size of the diagram, the following embodiments of the present disclosure are illustrated with few enlarged multiplexers as examples to clearly show positional and connectional relationships. In practice, the display panel includes numerous multiplexers.

Figure 1:
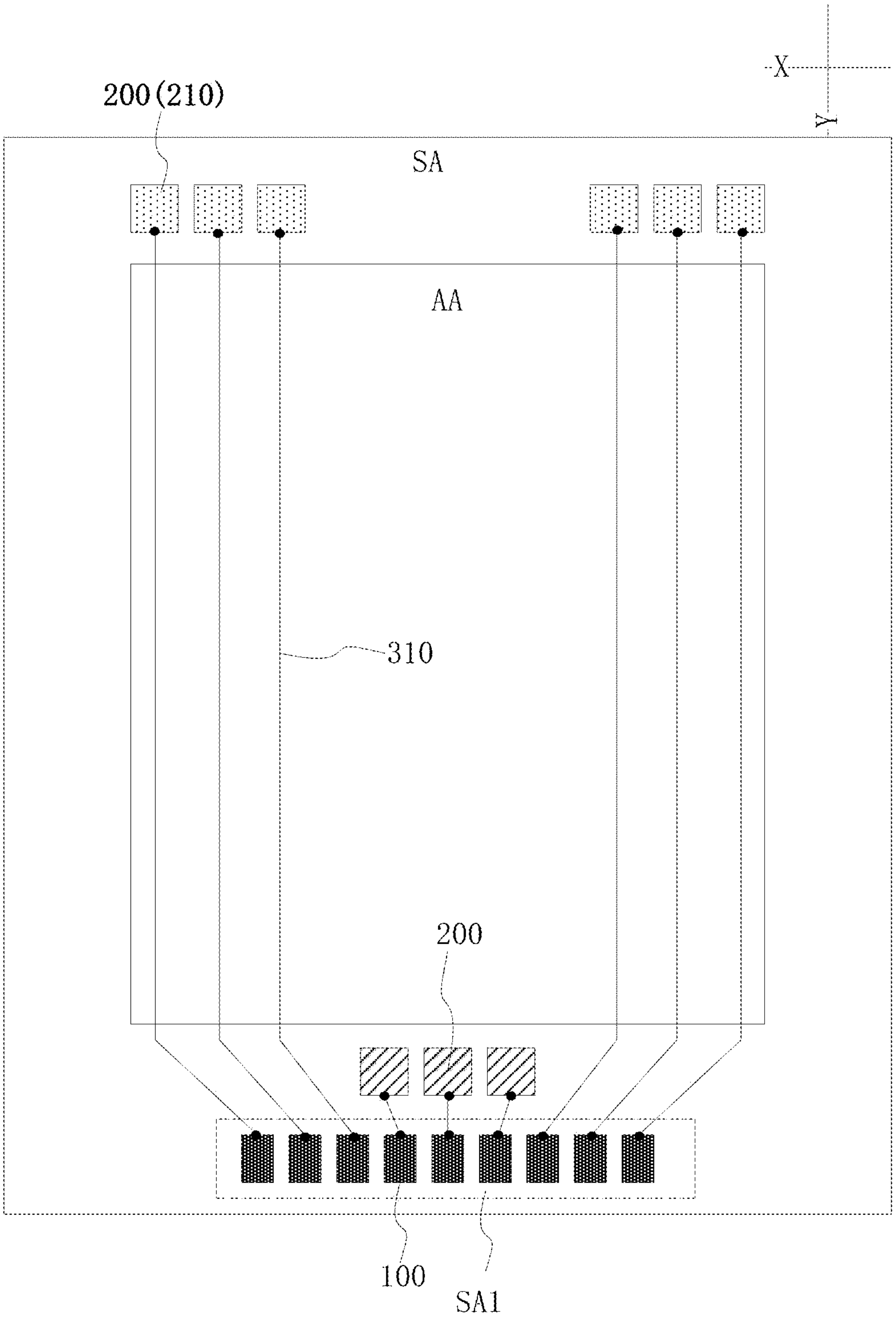
FIG. 1 is a schematic structural diagram showing a display panel according to an embodiment of the present disclosure.

Reference is made to FIG. 1, which is a schematic structural diagram showing the display panel according to an embodiment of the present disclosure. The display panel according to the embodiment of the present disclosure includes an active area AA and a border area SA.

The border area SA includes a chip bonding area SA1 on a first side of the active area AA along a first direction Y. Multiple data pins 100 are arranged in the chip bonding area SA1.

Multiple multiplexers 200 are arranged in the border area SA. The multiple multiplexers 200 includes at least first multiplexers 210. The first multiplexers 210 are arranged on a second side of the active area AA. The first side of the active area AA is opposite to the second side of the active area AA.

An input terminal of the first multiplexer 210 is electrically connected to a first data input wire 310. The first data input wire 310 is electrically connected to the data pin 100 through the active area AA.

Figure 2:
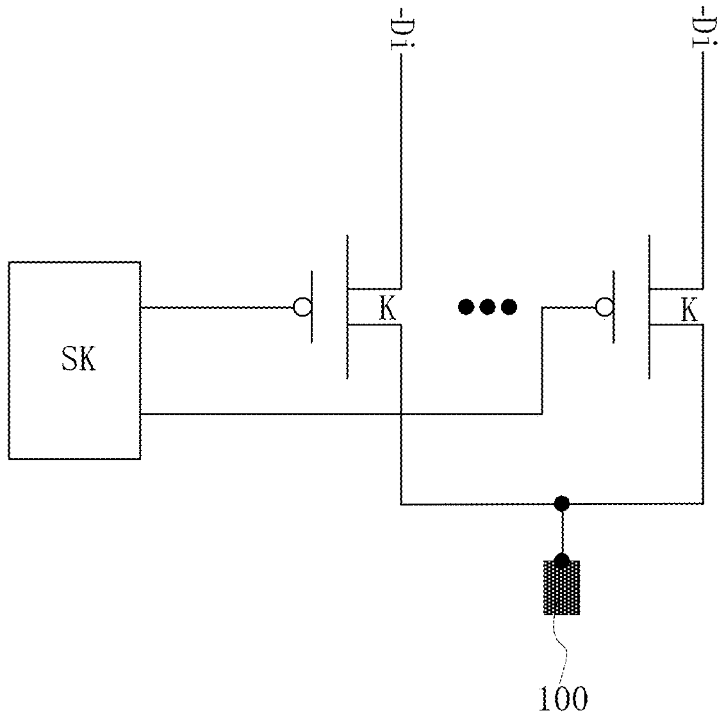
FIG. 2 is a schematic structural diagram showing a multiplexer according to an embodiment of the present disclosure.

The multiplexer according to the embodiment of the present disclosure is a device that selectively outputs a data signal to a corresponding pixel circuit. the data signal is outputted by the data pin and then is transmitted to the multiplexer. An output terminal of the multiplexer is electrically connected to multiple data wires, and transmits the data signal to the pixel circuit through the corresponding data wire. Reference is made to FIG. 2, which is a schematic structural diagram showing the multiplexer according to an embodiment of the present disclosure. The multiplexer according to the embodiment of the present disclosure includes multiple switch transistors K. A first terminal of each of the multiple switch transistors K is electrically connected to the data pin 100. A second terminal of each of the multiple switch transistors K is connected to a corresponding data wire Di. A control terminal of each of the multiple switch transistors K is electrically connected to a control terminal SK. The switch transistor K receives the data signal outputted by the data pin 100. Then, the control terminal SK selects a corresponding switch transistor K to turn on the selected switch transistor K, and transmits the data signal to the data wire Di connected to the switch transistor K that is turned on. Then, the data signal is transmitted to the corresponding pixel circuit. All the switch transistors K in the embodiments of the present disclosure are switched on similarly, or at least one of the switch transistors K is switched on differently. The switch transistor K is an N-type transistor or a P-type transistor, which is not limited in the present disclosure.

It should be understood that the first data input wire according to the embodiment of the present disclosure is configured to transmit the data signal outputted by the data pin to the first multiplexer. The first multiplexer selectively outputs the data signal to the corresponding data wire, and thence to the corresponding pixel circuit. Since the first data input wire provided in the embodiment of the present disclosure is configured to transmit the data signal outputted by the data pin to the first multiplexer, there is no physical connection points between the first data input wire and the pixel circuit at the active area. In addition, according to the embodiments provided in the present disclosure, the first multiplexers are arranged on the second side of the active area. Less wiring is arranged in the chip bonding area in the border area, and therefore the wires can be easily arranged in the chip bonding area in the border area, facilitating a narrow border of the display apparatus.

Figure 3:
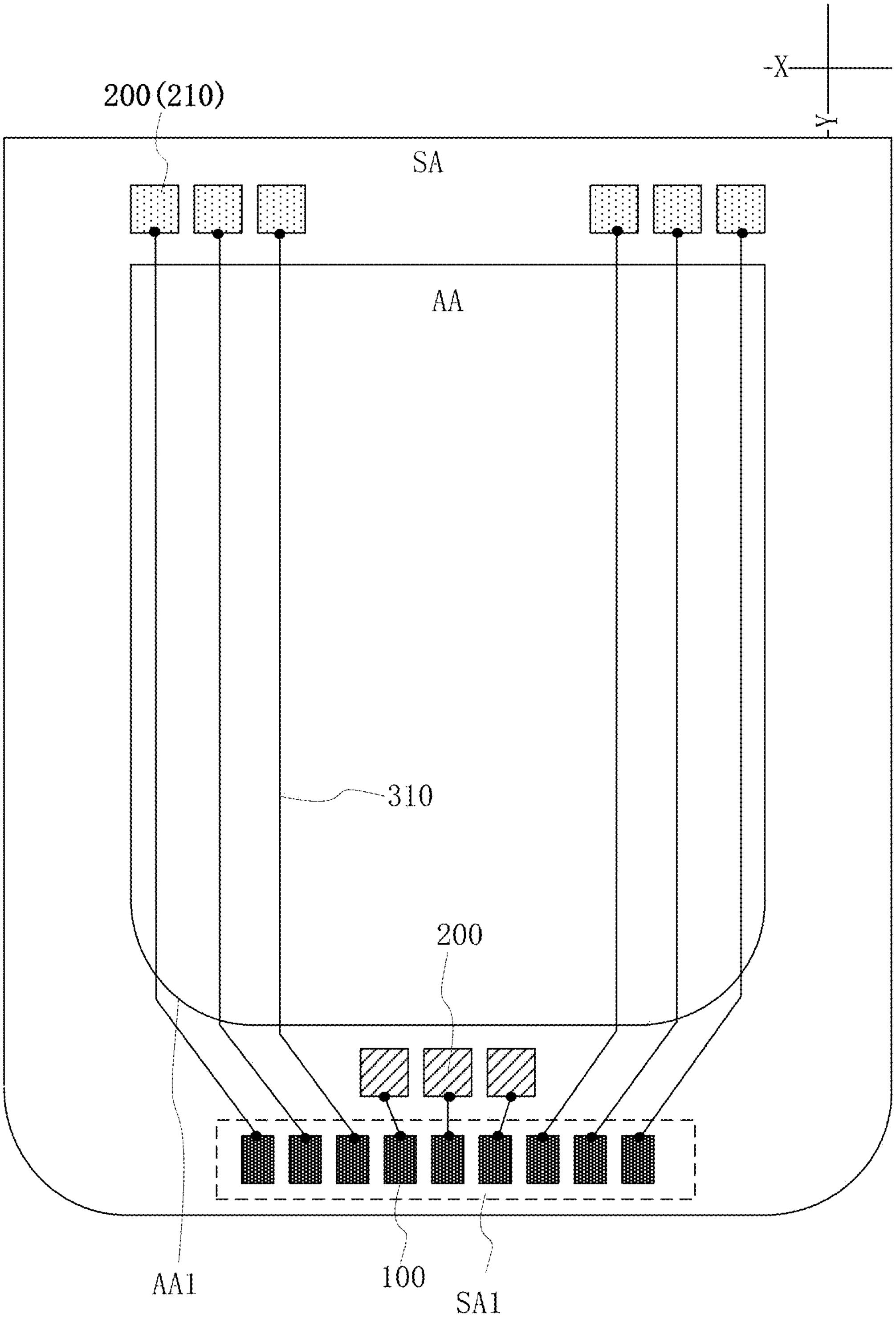
FIG. 3 is a schematic structural diagram showing a display panel according to another embodiment of the present disclosure.

In an embodiment of the present disclosure, the active area is provided with a curved edge. The curved edge is a fillet. Reference is made to FIG. 3, which is a schematic structural diagram showing the display panel according to another embodiment of the present disclosure. Along a second direction X, the active area AA includes a first curved edge AA1 on a first side of the active area AA. No multiplexer 200 is arranged at the first curved edge AA1. The first direction Y and the second direction X intersect. The first direction Y is a direction along which the data wires in the display panel extend. The second direction X is a direction along which scan lines in the display panel extend. In an embodiment, the first direction Y is perpendicular to the second direction X.

It should be understood that in the display panel according to the embodiment of the present disclosure, the multiplexers arranged at the first curved edge are described as the first multiplexers, and arranged in the border area on a second side of the active area. Less wiring is arranged in the chip bonding area in the border area, and further less wiring is arranged in the border area at both sides along the second direction, to facilitate a narrow border of the display apparatus.

As shown in FIG. 1 and FIG. 3, the first multiplexers 210 according to the embodiments of the present disclosure are arranged along an edge of the active area AA in sequence. That is, the first multiplexers 210 are not clustered, to facilitate wiring. How the first multiplexers are arranged is not limited in the embodiments of the present disclosure but depends on actual demands.

Figure 4:
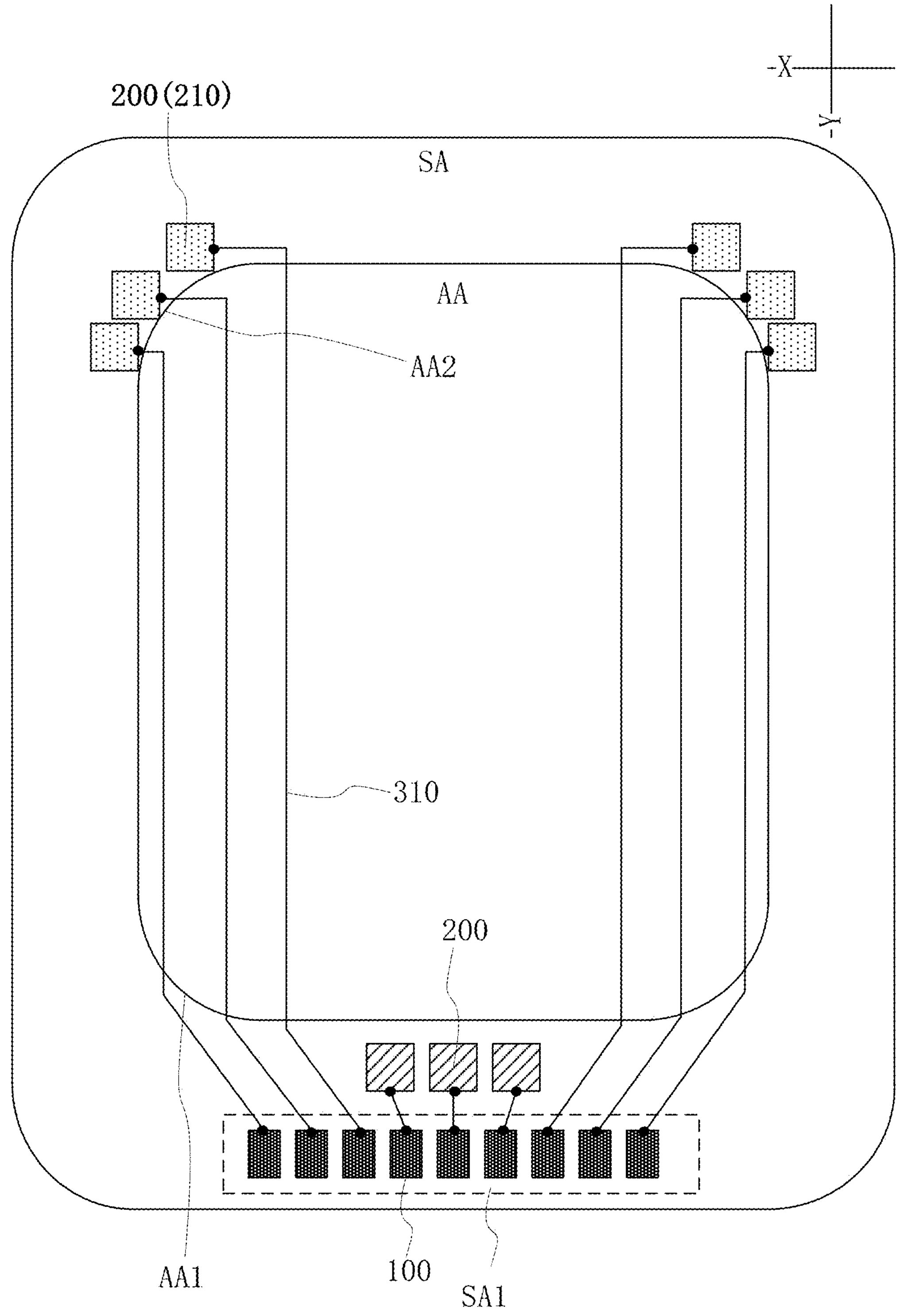
FIG. 4 is a schematic structural diagram showing a display panel according to another embodiment of the present disclosure.

The first side of the active area is provided with the curved edge according to the embodiments of the present disclosure. Similarly, the second side of the active area is also provided with a curved edge. Reference is made to FIG. 4, which is a schematic structural diagram showing the display panel according to another embodiment of the present disclosure. The active area AA is further provided with a second curved edge AA2 at the second side along the second direction X. The first multiplexers 210 are arranged along the second curved edge AA2 in sequence. The first direction Y and the second direction X intersect.

Figure 5:
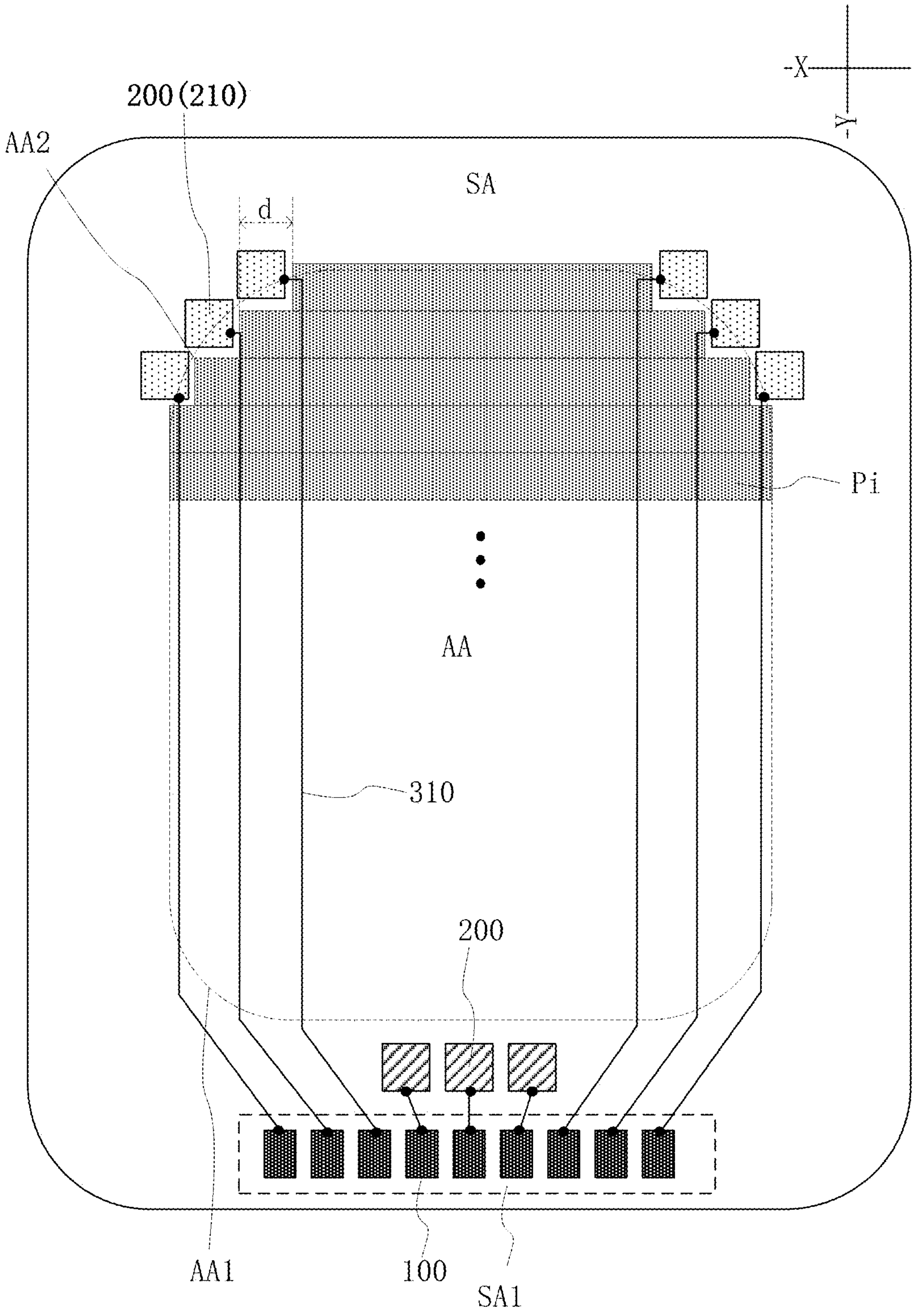
FIG. 5 is a schematic structural diagram showing a display panel according to another embodiment of the present disclosure.

The curved edge of the active area according to the embodiments of the present disclosure is formed by arranging pixels in the active area. The first multiplexers are arranged at pixel gaps along the second curved edge in sequence. Reference is made to FIG. 5, which is a schematic structural diagram showing the display panel according to another embodiment of the present disclosure. The active area AA includes multiple pixel rows Pi arranged along the first direction Y. The pixel gaps d are formed by adjacent pixel rows Pi at the second curved edge AA2 along the second direction X. The first multiplexers 210 are arranged at the pixel gaps d. The first direction Y and the second direction X intersect.

It should be understood that the pixel gaps between adjacent pixel rows according to the embodiments of the present disclosure are equal or different in size. A relatively large number of first multiplexers are arranged at a relatively large pixel gap, and a relatively small number of first multiplexers are arranged at a relatively small pixel gap. In other embodiments, the first multiplexers are equally arranged among the pixel gaps. The pixel gaps according to the embodiments of the present disclosure are divided into first pixel gaps and second pixel gaps. The first pixel gap is longer than the second pixel gap along the second direction. The number of the first multiplexers arranged at the first pixel gap is greater than or equal to the number of the first multiplexers arranged at the second pixel gap, which is not limited in the present disclosure.

Figure 6:
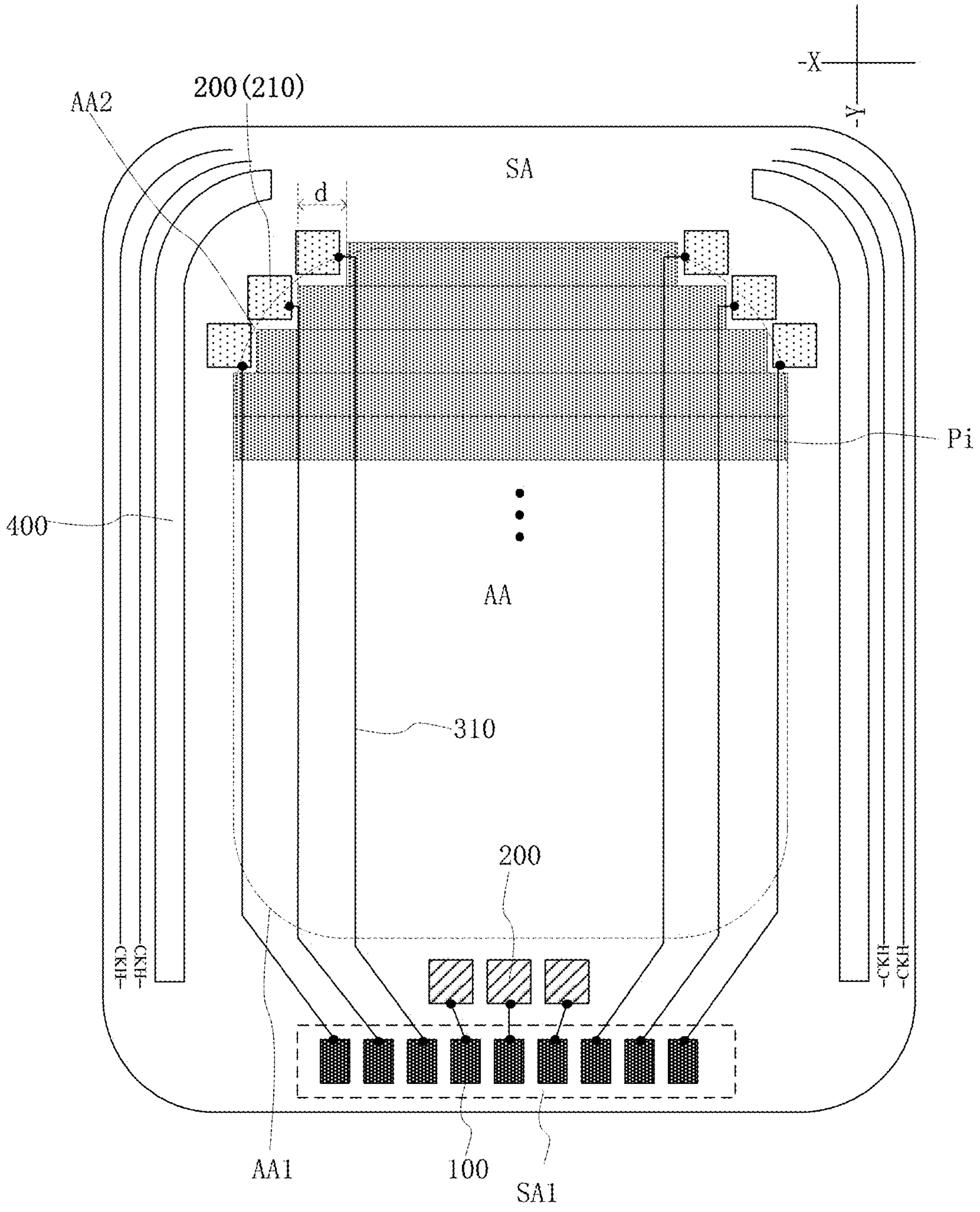
FIG. 6 is a schematic structural diagram showing a display panel according to another embodiment of the present disclosure.

Coupling between numerous wires in the border area can be prevented according to the embodiments of the present disclosure. Reference is made to FIG. 6, which is a schematic structural diagram showing the display panel according to another embodiment of the present disclosure. A scanning drive circuit 400 and scanning control signal wiring CKH are arranged in the border area SA along the first direction Y. The first multiplexers 210 are arranged between the scanning drive circuit 400 and the active area AA. The scanning control signal wiring CKH is arranged on a side of the scanning drive circuit 400 away from the active area AA.

It should be understood that the scanning control signal wiring in the embodiments of the present disclosure includes a clock signal wire for display control of the display panel, and a power supply wire. The scanning control signal wiring is arranged on the side of the scanning drive circuit away from the active area. Therefore, no cross-coupling occurs between the scanning control signal wiring and the scanning wiring, which is connected to the scanning drive circuit and transmits the scanning signal to the active area. In this way, the scanning wiring can transmit the scanning signal effectively, and the display results can be optimized.

Figure 7:
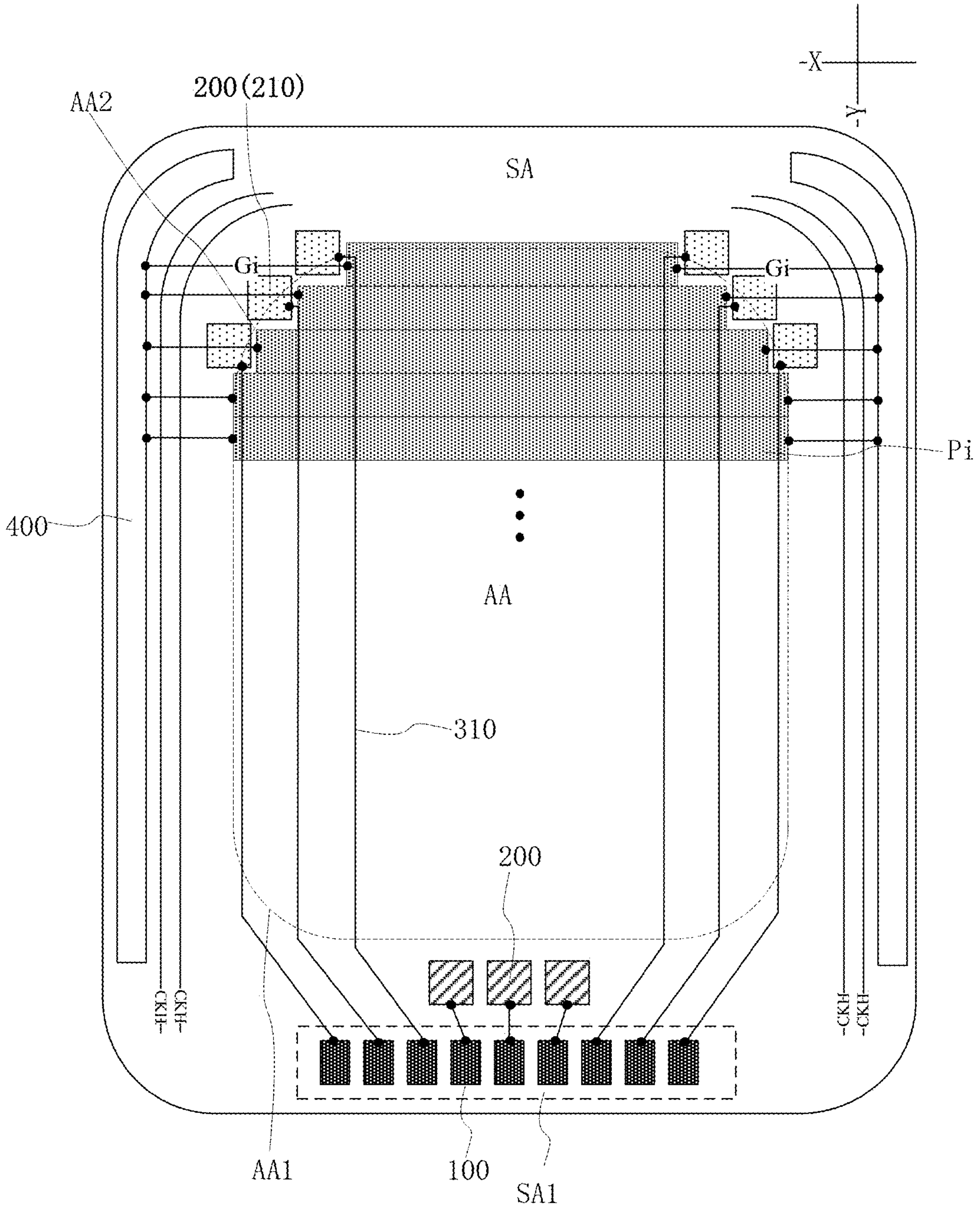
FIG. 7 is a schematic structural diagram showing a display panel according to another embodiment of the present disclosure.

In some embodiments, the scanning control signal wiring is arranged between the scanning drive circuit and the first multiplexers. Reference is made to FIG. 7, which is a schematic structural diagram showing the display panel according to another embodiment of the present disclosure. A scanning drive circuit 400 and scanning control signal wiring CKH are arranged in the border area SA along the first direction Y. The first multiplexers 210 are arranged between the scanning drive circuit 400 and the active area AA. The scanning control signal wiring CKH is arranged between the scanning drive circuit 400 and the first multiplexers 210. The active area AA includes multiple pixel rows Pi arranged along the first direction Y. The scanning drive circuit 400 is electrically connected to the multiple pixel rows Pi through the respective scanning wires Gi. All the scanning wires Gi intersect with and are insulated from the scanning control signal wiring CKH along the direction perpendicular to the display panel.

It should be understood that the scanning control signal wiring according to the embodiments of the present disclosure are arranged between the scanning drive circuit and the first multiplexers, and all the scanning wires intersect with the scanning control signal wiring. Therefore, the scanning wires are subjected to coupling between the scanning control signal wiring uniformly. In this way, scanning signals transmitted by the scanning wires are of equal quality, and therefore the scanning control signal wiring results in no negative influence on the display results of the display apparatus.

Figure 8:
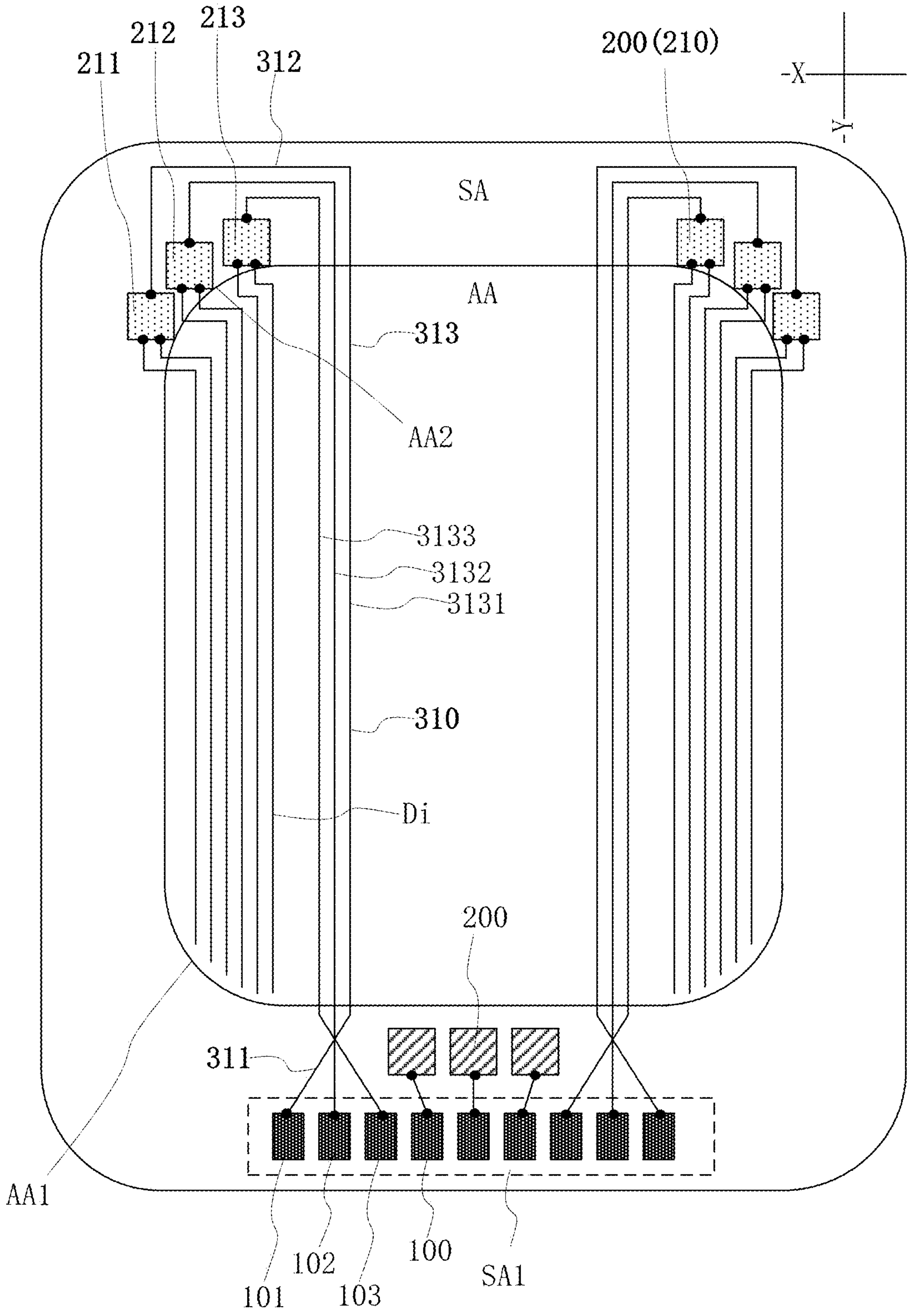
FIG. 8 is a schematic structural diagram showing a display panel according to another embodiment of the present disclosure.

In the embodiments of the present disclosure, the first multiplexers are electrically connected to the data pins through the first data input wires, and each are electrically connected to the pixel circuit in the active area through multiple data wires. The data signal from the data pin is transmitted to the first multiplexer and then is outputted through a corresponding data wire. Reference is made to FIG. 8, which is a schematic structural diagram showing the display panel according to another embodiment of the present disclosure. The input terminal and the output terminal of each of the first multiplexers 210 are arranged on two sides of the first multiplexer 210 along the first direction Y, respectively. The input terminal of the first multiplexer 210 is electrically connected to the first data input wire 310. The output terminals of the first multiplexers 210 are electrically connected to the different data wires Di. The input terminal of the first multiplexer 210 is arranged on a side different from the output terminal of the first multiplexer 210. Therefore, wires connected to the first multiplexers 210 are not clustered, to facilitate wiring and fabrication.

Referring to FIG. 8, the input terminals of the first multiplexers 210 according to the embodiments of the present disclosure are arranged on a side of the first multiplexers 210 away from the active area AA. The output terminals of the first multiplexers 210 are arranged on a side of the first multiplexers 210 toward the active area AA. In this case, the first multiplexers 210 are connected to the first data input wires 310 on the side of the first multiplexers 210 away from the active area AA, to facilitate the wiring. In addition, the output terminals of the first multiplexers 210 are arranged on the side toward the active area AA, to facilitate the connection of the data wires Di in the active area AA.

In the embodiments of the present disclosure, the first data input wires are electrically connected to the data pins in the border area through the active area. Therefore, the first data input wires each include a segment arranged in the border area on the first side of the active area, a segment arranged in the active area, and a segment arranged in the border area on the second side of the active area. As shown in FIG. 8, the first data input wires 310 each include a first data transfer wire 311 arranged in the border area SA on the first side of the active area AA, a data connecting wire 313 arranged in the active area AA and a second data transfer wire 312 arranged in the border area SA on the second side of the active area AA. One terminal of the first data transfer wire 311 is electrically connected to the data pin 100, and the other terminal of the first data transfer wire 311 is electrically connected to one terminal of the data connecting wire 313, The other terminal of the data connecting wire 313 is electrically connected to one terminal of the second data transfer wire 312. The other terminal of the second data transfer wire 312 is electrically connected to the input terminal of the first multiplexer 210.

Referring to FIG. 8, the second data transfer wire 312 is at least partially arranged on the side of the first multiplexer 210 away from the active area AA. The side of the first multiplexer 210 away from the active area AA provides plenty of space for wiring. The second data transfer wires 312 are connected to the input terminals of the first multiplexers 210 on the side of the first multiplexers 210 away from the active area AA, and each are at least partially arranged on the side of the first multiplexer 210 away from the active area AA, to facilitate arrangement of the second data transfer wires 312.

In some embodiments of the present disclosure, the first multiplexers are connected to the respective data pins without arranging the data pins in a different order. Referring to FIG. 8, on one side of the active area AA along the second direction X, three first multiplexers are arranged at the second curved edge AA2 on the left. Along the second direction X, the first multiplexers 210 are arranged in sequence from a 1st first multiplexer 211 to an Nth first multiplexer (for example, the 1st first multiplexer 211 to a 3rd first multiplexer 213 as shown in FIG. 8). The first direction Y and the second direction X intersect.

The data connecting wire connected to an ith first multiplexer is an ith data connecting wire, and the data pin connected to the ith first multiplexer is an ith data pin. In the active area, the first data connecting wire to an Nth data connecting wire (for example, a first data connecting wire 3131 to a third data connecting wire 3133 from right to left) are arranged in a direction opposite to a direction in which the 1st first multiplexer to an Nth first multiplexer (for example, the 1st first multiplexer 211 to the 3rd first multiplexer 213 from left to right) are arranged. That is, the first data pin to an Nth data pin (for example, a first data pin 101 to a third data pin 103 from left to right) are arranged in the same direction as the 1st first multiplexer to the Nth first multiplexer. N is an integer greater than or equal to two, and i is a positive integer less than or equal to N.

Figure 9:
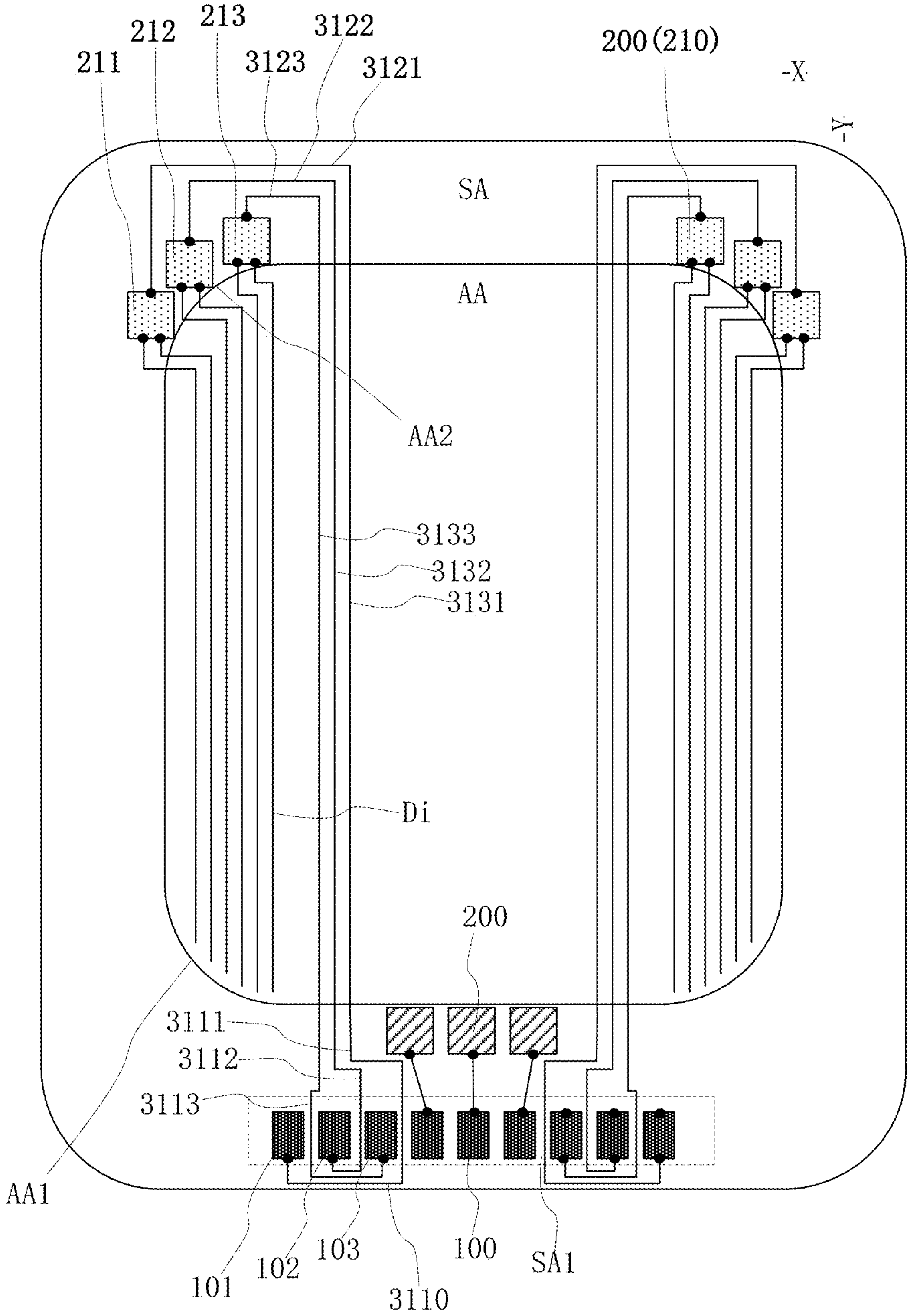
FIG. 9 is a schematic structural diagram showing a display panel according to another embodiment of the present disclosure.

In order to prevent the first data transfer wires from intersecting in the area between the data pins and the active area, the first data transfer wires extend to a side of the data pins away from the active area and then are connected to the data pins. Reference is made to FIG. 9, which is a schematic structural diagram showing the display panel according to another embodiment of the present disclosure. On the basis of FIG. 8, the first data transfer wire connected to the ith first multiplexer is an ith first data transfer wire. The ith first data transfer wire includes a lead wire (not indicated) and a winding wire 3110. As shown in FIG. 9, the 1st first data transfer wire 3111 to a 3rd first data transfer wire 3113 each include a winding wire 3110.

The lead wire of the ith first data transfer wire is electrically connected to the ith data connecting wire, and extends to a side of the data pin away from the active area. The winding wire 3110 of the ith first data transfer wire is arranged on the side of the data pin 100 away from the active area AA. Two terminals of the winding wire 3110 of the ith first data transfer wire are electrically connected to the lead wire of the ith first data transfer wire and the ith data pin respectively. The winding wires 3110 do not cross along the direction perpendicular to the plane of the display panel.

Referring to FIG. 9, the first data transfer wires do not cross due to the arrangement of the lead wires and the winding wires 3110 of the first data transfer wires. In the same way, the second transfer wires do not cross due to the by optimized arranged of the second transfer wires. That is, the second data transfer wire connected to the ith first multiplexer is an ith second data transfer wire. The 1st second data transfer wire to the Nth second data transfer wire are arranged in sequence along the first direction Y, and do not cross along the direction perpendicular to the plane of the display panel. Along the direction in which the 1st second data transfer wire to the Nth second data transfer wire (for example, the 1st second data transfer wire 3121 to the 3rd second data transfer wire 3123 as shown in FIG. 9) are arranged, the Nth second data transfer wire is arranged on the side near the active area AA. Therefore, the 1st second data transfer wire 3121 to the 3rd second data transfer wire 3123 do not cross.

Figure 10:
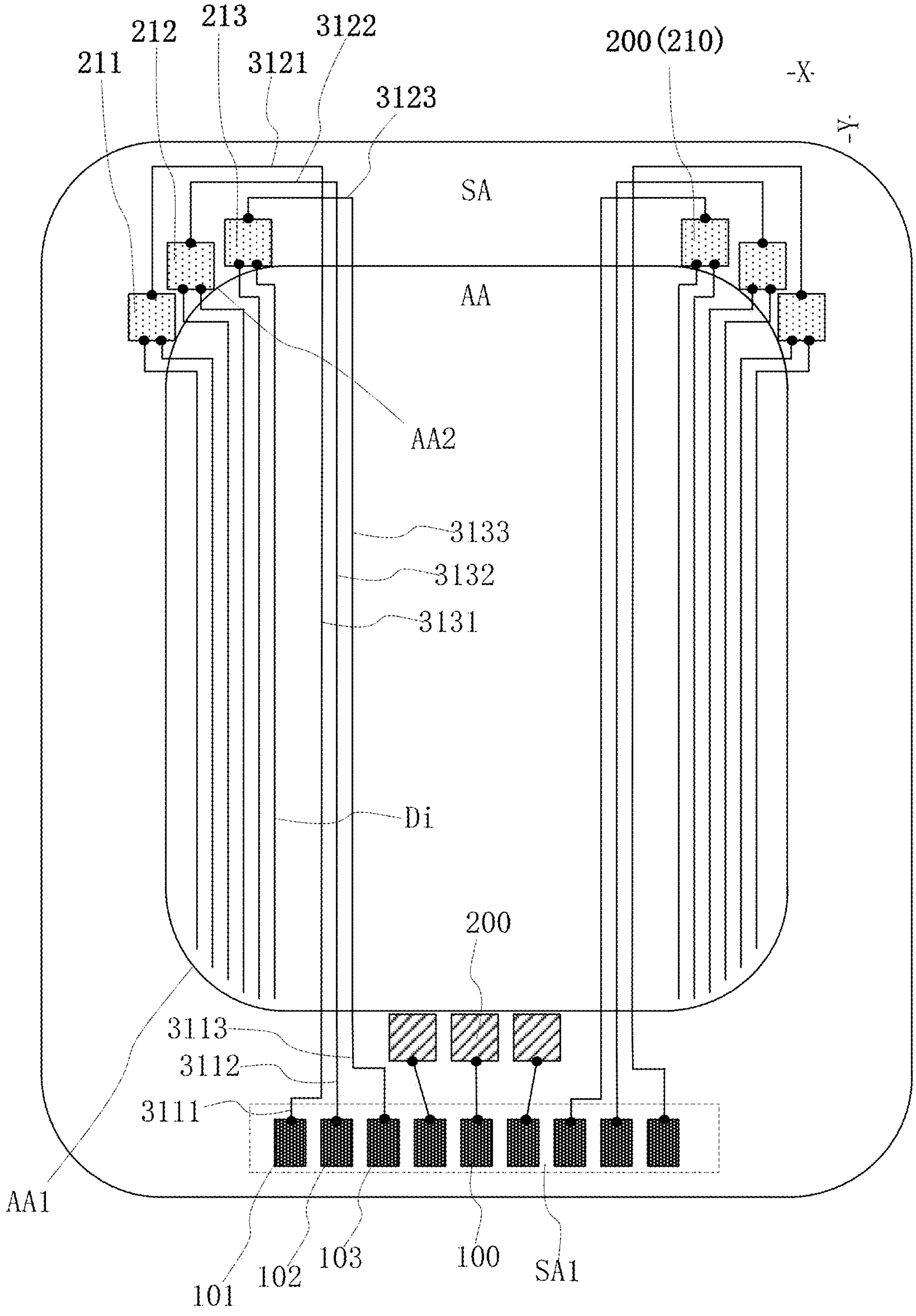
FIG. 10 is a schematic structural diagram showing a display panel according to another embodiment of the present disclosure.

Reference is made to FIG. 10, which is a schematic structural diagram showing the display panel according to another embodiment of the present disclosure. On one side of the active area AA along the second direction X, three first multiplexers are arranged at the second curved edge AA2 on the left. Along the second direction X, the first multiplexers 210 are arranged in sequence from a 1st first multiplexer 211 to an Nth first multiplexer (for example, the 1st first multiplexer 211 to a 3rd first multiplexer 213 as shown in FIG. 10). The first direction Y and the second direction X intersect.

The data connecting wire connected to an ith first multiplexer is an ith data connecting wire, and the data pin connected to the ith first multiplexer is an ith data pin. In the active area, the first data connecting wire to an Nth data connecting wire (for example, a first data connecting wire 3131 to a third data connecting wire 3133 from left to right) are arranged in the same direction as the 1st first multiplexer to an Nth first multiplexer (for example, the 1st first multiplexer 211 to the 3rd first multiplexer 213 from left to right). That is, the first data pin to an Nth data pin (for example, a first data pin 101 to a third data pin 103 from left to right) are arranged in the same direction as the 1st first multiplexer to the Nth first multiplexer. N is an integer greater than or equal to two, and i is a positive integer less than or equal to N.

Referring to FIG. 10, the first data connecting wire 3131 to the third data connecting wire 3133 are arranged in the same direction as the first data pin 101 to the third data pin 103. Therefore, the second data transfer wires 311 are electrically connected to the data pins 100 between the data pins 100 and the active area AA, with the second data transfer wires 311 do not cross. The first data transfer wire connected to the ith first multiplexer is the ith first data transfer wire, which is electrically connected to the ith data pin on the side of the data pin 100 toward the active area AA.

In one embodiment, the 1st first multiplexer 211 to the 3rd first multiplexer 213 are arranged in the same direction as the first data connecting wire 3131 to the third data connecting wire 3133. Therefore, the first second data transfer wire 3121 to the third second data transfer wire 3123 at least partially cross. In this case, the second data transfer wires are formed by different electric-conductive layers. The second data transfer wire connected to the ith first multiplexer is the ith second data transfer wire. The 1st second data transfer wire to the Nth second data transfer wire are arranged in sequence along the first direction Y, and cross along the direction perpendicular to the panel of the display panel.

It should be noted that the above embodiments of the present disclosure as shown in FIG. 8 to FIG. 10 show only part of wiring arrangements applicable to the present disclosure. In other embodiments of the present disclosure, the first multiplexers, the first data transfer wires, the data connecting wires, the second data transfer wires and the data pins may be arranged and connected in other manners, which are not limited in the present disclosure.

Figure 11:
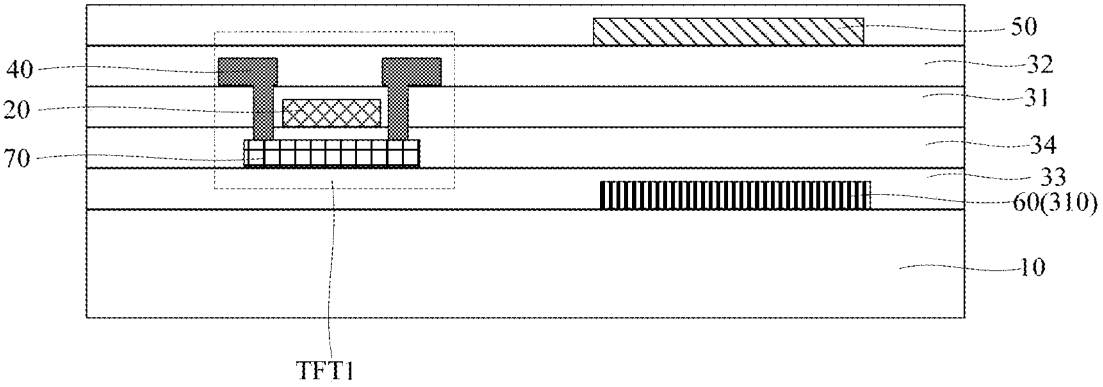
FIG. 11 is a schematic structural diagram showing a display panel according to another embodiment of the present disclosure.

Reference is made to FIG. 11, which is a schematic structural diagram showing the display panel according to another embodiment of the present disclosure. The display panel according to the present disclosure includes an array layer. The array layer includes a substrate 10, a gate metal layer 20 arranged on a side of the substrate 10, a first insulating layer 31 arranged on a side of the gate metal layer 20 away from the substrate 10, a source-drain metal layer 40 arranged on a side of the first insulating layer 31 away from the substrate 10, a second insulating layer 32 arranged on a side of the source-drain metal layer 40 away from the substrate 10, and a transfer metal layer 50 arranged on a side of the second insulating layer 32 away from the substrate 10. The display panel further includes a third insulating layer 33 arranged between the substrate 10 and the gate metal layer 20, and a transmission metal layer 60 arranged between the third insulating layer 33 and the substrate 10. The first data input wire 310 is at least partially arranged in the transmission metal layer 60.

Figure 12:
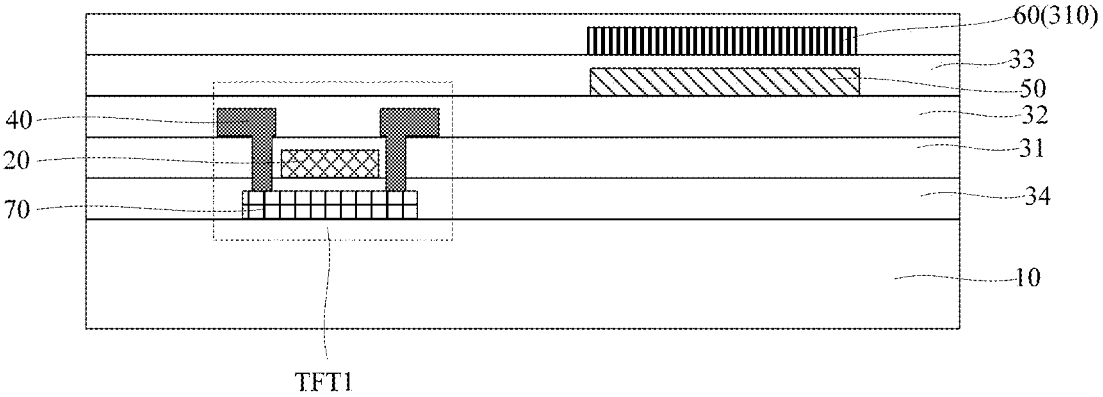
FIG. 12 is a schematic structural diagram showing a display panel according to another embodiment of the present disclosure.

Reference is made to FIG. 12, which is a schematic structural diagram showing the display panel according to another embodiment of the present disclosure. In some embodiments of the present disclosure, the transmission metal layer 60 is arranged above the transfer metal layer 50. That is, the display panel further includes a third insulating layer 33 arranged on a side of the transfer metal layer 50 away from the substrate 10, and a transmission metal layer 60 arranged on a side of the third insulating layer 33 away from the substrate 10. The first data input wire 310 is at least partially arranged in the transmission metal layer 60.

In an embodiment of the present disclosure, the transmission metal layer is made of aluminum, to reduce sheet resistance of the first data transmission wire. Therefore, the first data transmission wire can transmit signals effectively. The third insulating layer ranges from 5000 to 10000 angstroms in thickness. Therefore, the third insulating layer can perform excellently in insulation, and then the coupling between the wires on both sides of the third insulating layer is reduced.

In some embodiments of the present disclosure, a transistor of the display panel is a top-gate transistor. Referring to FIG. 11, a semiconductor layer 70 is arranged between the substrate 10 and the gate metal layer 20, and a gate insulating layer 34 is arranged between the semiconductor layer 70 and the gate metal layer 20. The gate metal layer 20 includes a gate. The semiconductor layer 70 includes an active layer. The source-drain metal layer 40 includes a source and a drain that are in contact with the active layer through via holes. The gate, the active layer, the source and the drain form a top-gate transistor TFT1.

Figure 13:
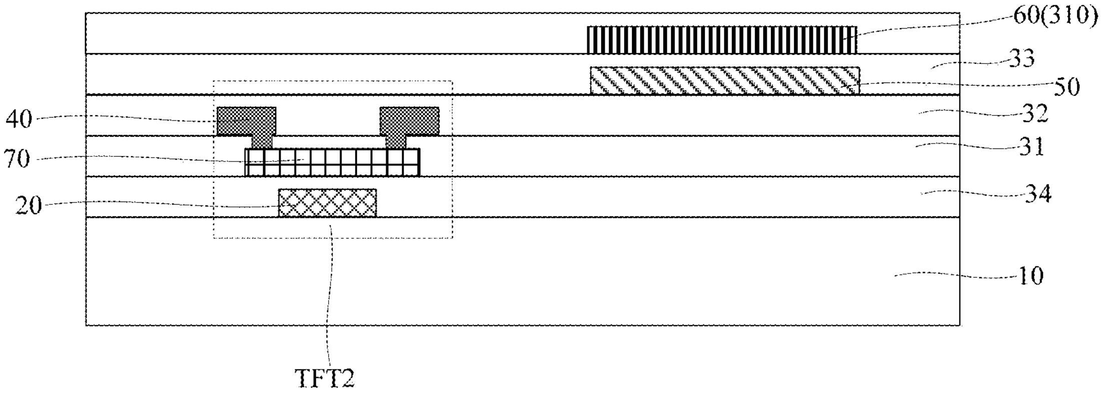
FIG. 13 is a schematic structural diagram showing a display panel according to another embodiment of the present disclosure.

In some embodiments of the present disclosure, the transistor of the display panel is a bottom-gate transistor. FIG. 13 is a schematic structural diagram showing the display panel according to another embodiment of the present disclosure. A semiconductor layer 70 is arranged between the gate metal layer 20 and the first insulating layer 31, and a gate insulating layer 34 is arranged between the gate metal layer 20 and the semiconductor layer 70. The gate metal layer 20 includes a gate. The semiconductor layer 70 includes an active layer. The source-drain metal layer 40 includes a source and a drain that are in contact with the active layer through via holes. The gate, the active layer, the source and the drain form a top-gate transistor TFT2.

In some embodiments of the present disclosure, multiple data wires are arranged in the active area and are connected to the output terminals of the multiplexers. The data connecting wires are arranged in a layer different than the data wires, for preventing coupling between the data wires and the data connecting wires. For example, the data wires are arranged in the source-drain metal layer, while the data connecting wires are arranged in the transfer metal layer or the transmission metal layer, which is not limited in the present disclosure.

In some embodiments of the present disclosure, the first input wire is arranged in the same metal layer as a whole. For example, the first input wires are arranged in the transmission metal layer completely. In other embodiments of the present disclosure , the first input wire is divided into segments arranged in different metal layers. For example, two of the first data transfer wire, the data connecting wire and the second data transfer wire are arranged in the same layer or in different layers. In some embodiments, the data connecting wires are arranged in the transmission metal layer while the first data transfer wires and the second data transfer wires are arranged in the border area, without considering the intersection between the first data transfer wires as well as the second data and the data wires as well as the scanning wires in the active area. Therefore, at least one of the first data transfer wire and the second data transfer wire is arranged in the gate metal layer, the source-drain metal layer or the transfer metal layer, which is not limited in the present disclosure.

The first data input wires in the embodiment of the present disclosure are electrically connected to the data pins through the active area, and therefore are relatively long. At least one of the first data transfer wire and the second data transfer wire is wider than the data connecting wire, to reduce the impedance of the first data input wire. Therefore, the first data input wire can transmit signals effectively.

Figure 14:
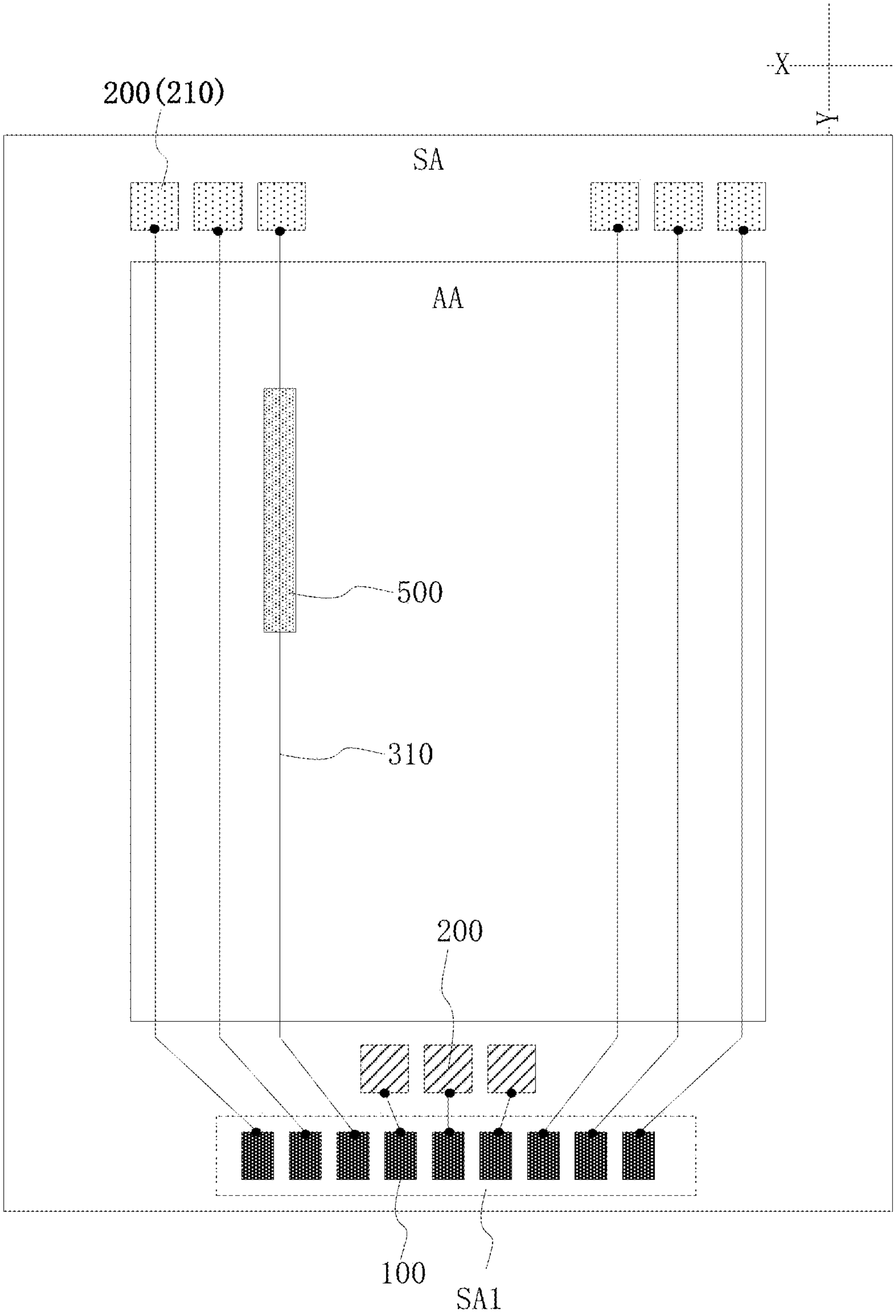
FIG. 14 is a schematic structural diagram showing a display panel according to another embodiment of the present disclosure.

Reference is made to FIG. 14, which is a schematic structural diagram of a display panel according to an embodiment of the present disclosure. The display panel includes a shielding signal wire 500 arranged in a different layer than at least part of the first data input wire 310. The first data input wire 310 at least partially overlaps the shielding signal wire 500 along the direction perpendicular to the display panel and is insulated from the shielding signal wire 500, to prevent coupling between wires at other metal layers and the first data input wires 310. Therefore, the first data input wires 310 can transmit signals effectively.

Figure 15:
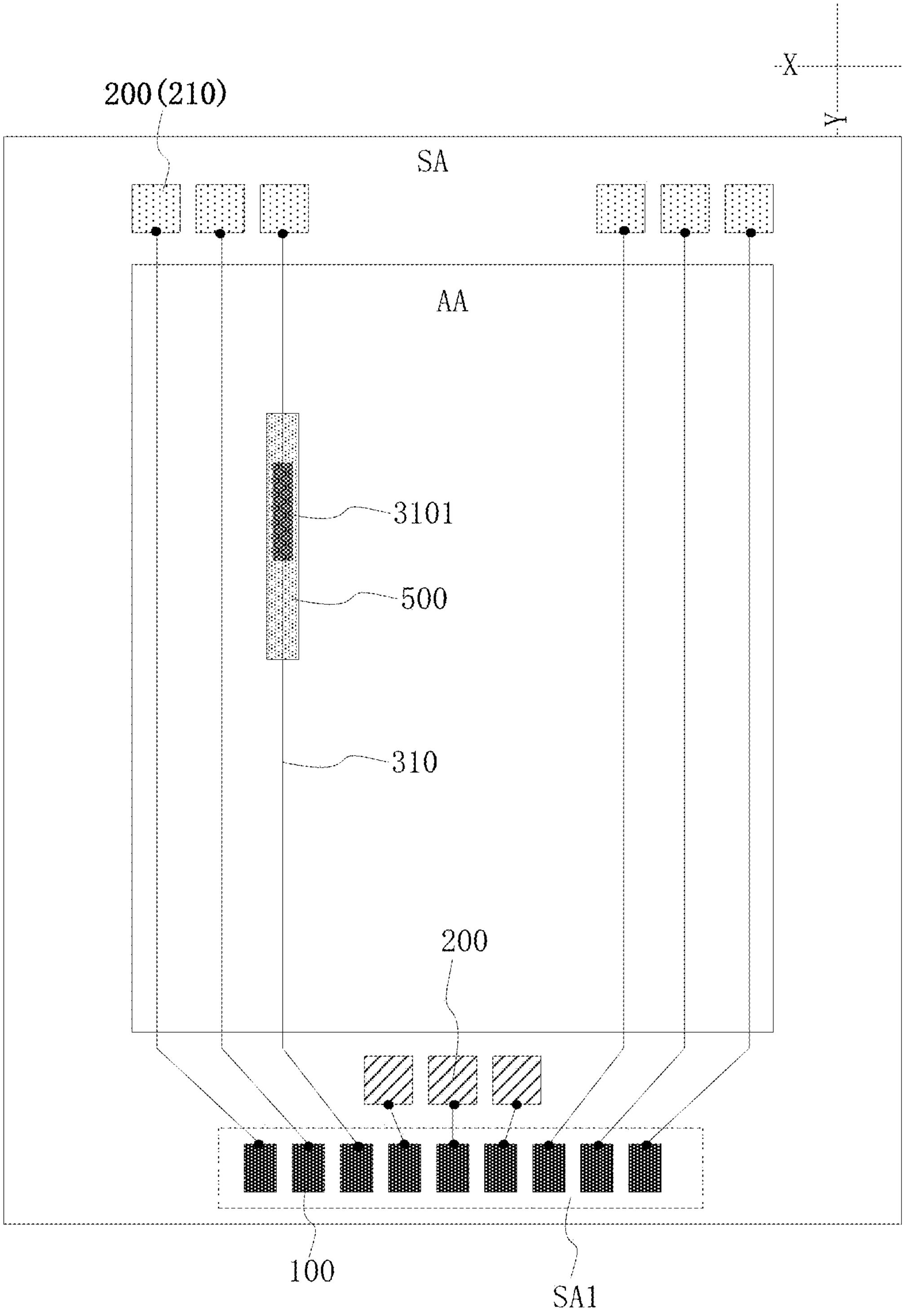
FIG. 15 is a schematic structural diagram showing a display panel according to another embodiment of the present disclosure.

Referring to FIG. 14, the segment of the first data input wire 310 along the direction in which the first data input wire 310 extends overlaps the shielding signal wire 500. In other embodiments, a compensation segment of the first data input wire along a direction intersecting the direction in which the first data input wire 310 extends overlaps the shielding signal wire 500. FIG. 15 is a schematic structural diagram showing the display panel according to another embodiment of the present disclosure. The first data input wire 310 includes a compensation segment 3101. The compensation wire segment 3101 is arranged in the same layer as or a different layer than other parts of the first data input wire 310, which is not limited herein. In one embodiment, the compensation wire 3101 is wider than other parts of the first data input wire 310, to reduce the overall impedance of the first data input wire 310. Therefore, the first data input wires

310 can transmit signals effectively. In addition, the shielding signal wire 500 overlaps the compensation segment 3101 along the direction perpendicular to the display panel and is insulated from the compensation segment 3101, for reducing coupling between the wires in other metal layers and the first data input wire 310. Therefore, the first data input wires 310 can transmit signals more effectively.

The shielding signal wire in the embodiments of the present disclosure is a signal wire for transmitting a constant direct current signal. In some embodiments, the shielding signal wire is one or more of a power supply wire, a reference voltage wire, a level wire or a ground wire, which is not limited in the embodiment of the present disclosure.

Figure 16:
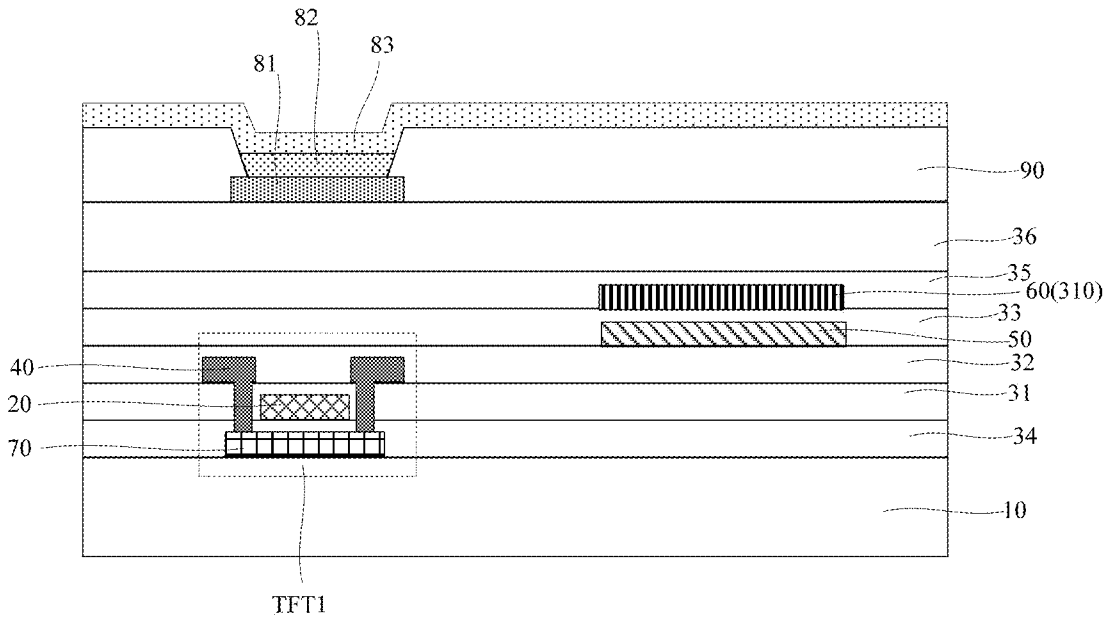
FIG. 16 is a schematic structural diagram showing a display panel according to another embodiment of the present disclosure.

In some embodiments of the present disclosure, light-emitting elements are arranged on the array layer of the display panel. The first data input wire does not overlap the anode of the light-emitting element, and therefore no coupling occurs between the first data input wire and the anode. Reference is made to FIG. 16, which is a schematic structural diagram showing the display panel according to another embodiment of the present disclosure. The display panel includes an array layer and light-emitting elements. The array layer includes a substrate 10 and the first data input wire 310 arranged on a side of the substrate 10.

In addition, a flatten layer 36 is included in the array layer (in some embodiments, the array layer includes a passivation layer 35 in contact with the flatten layer, which is not limited in the present disclosure). Light-emitting elements are arranged on the flatten layer. That is, the display panel includes multiple light-emitting elements on a side of the first data input wire 310 away from the substrate 100. The light-emitting element includes an anode 81, an emissive layer 82 and a cathode 83 stacked in sequence. The anode 81 is arranged on a side of the flatten layer 36 away from the substrate 10. A pixel definition layer 90 is arranged on the anode 81. The pixel definition layer 90 is provided with an opening for the anode 81. The emissive layer 82 and the cathode 83 are arranged in the opening. Along the direction perpendicular to the display panel, the first data input wire 310 does not overlap the anode 81, and therefore no coupling occurs between the first data input wire 310 and the anode 81.

Figure 17:
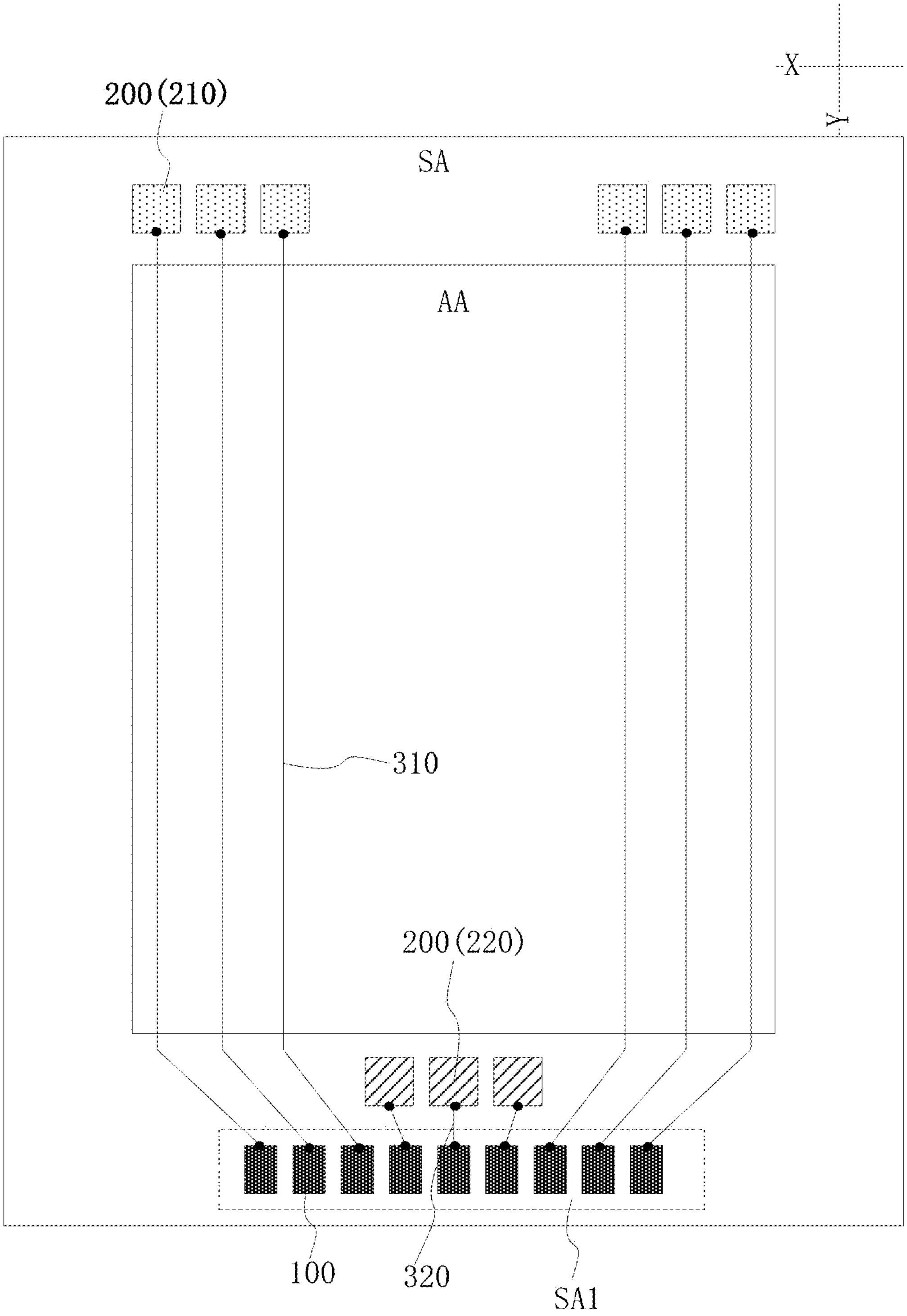
FIG. 17 is a schematic structural diagram showing a display panel according to another embodiment of the present disclosure.

Reference is made to FIG. 17, which is a schematic structural diagram showing the display panel according to another embodiment of the present disclosure. The multiple multiplexers 200 in the embodiments of the present disclosure include second multiplexers 220. The second multiplexers 220 are arranged between the active area AA and the chip bonding area SA. Multiple second data input wires 320 arranged between the second multiplexers 220 and the chip bonding area SA are arranged in the border area SA. An input terminal the second multiplexer 220 is electrically connected to the second data input wire 320. The second data input wire 320 is electrically connected to the data pin 100. The second data input wire 320 functions similarly to the first data input wire 310, that is, transmits the data signal outputted by the data pin 100 to a corresponding multiplexer 200.

The second data input wire is shorter than the first data input wire. The sheet resistance of at least part of the first data input wire is less than the sheet resistance of the second data input wire, for balancing the first data input wire and the second data input wire in efficiency of transmission. Therefore, the data signal transmitted by the first data input wire to the multiplexer is consistent with the data signal transmitted by the second data input wire to the multiplexer.

In other embodiments of the present disclosure, the impedance of the first data input wire is reduced by widening the first data input wire. That is, the first data input wire is at least partially wider than the second data input wire, and the impedance of the first data input wire is smaller than the impedance of the second data input wire, thereby balancing the first data input wire and the second data input wire in efficiency of transmission.

In other embodiments of the present disclosure, the impedance of the first data input wire is reduced by adjusting the thickness and material of the first data input wire, etc., which is not limited in the present disclosure.

Based on the embodiments, a display apparatus is provided according to the present disclosure. The display apparatus includes the display panel according to any one of the embodiments described above.

Figure 18:
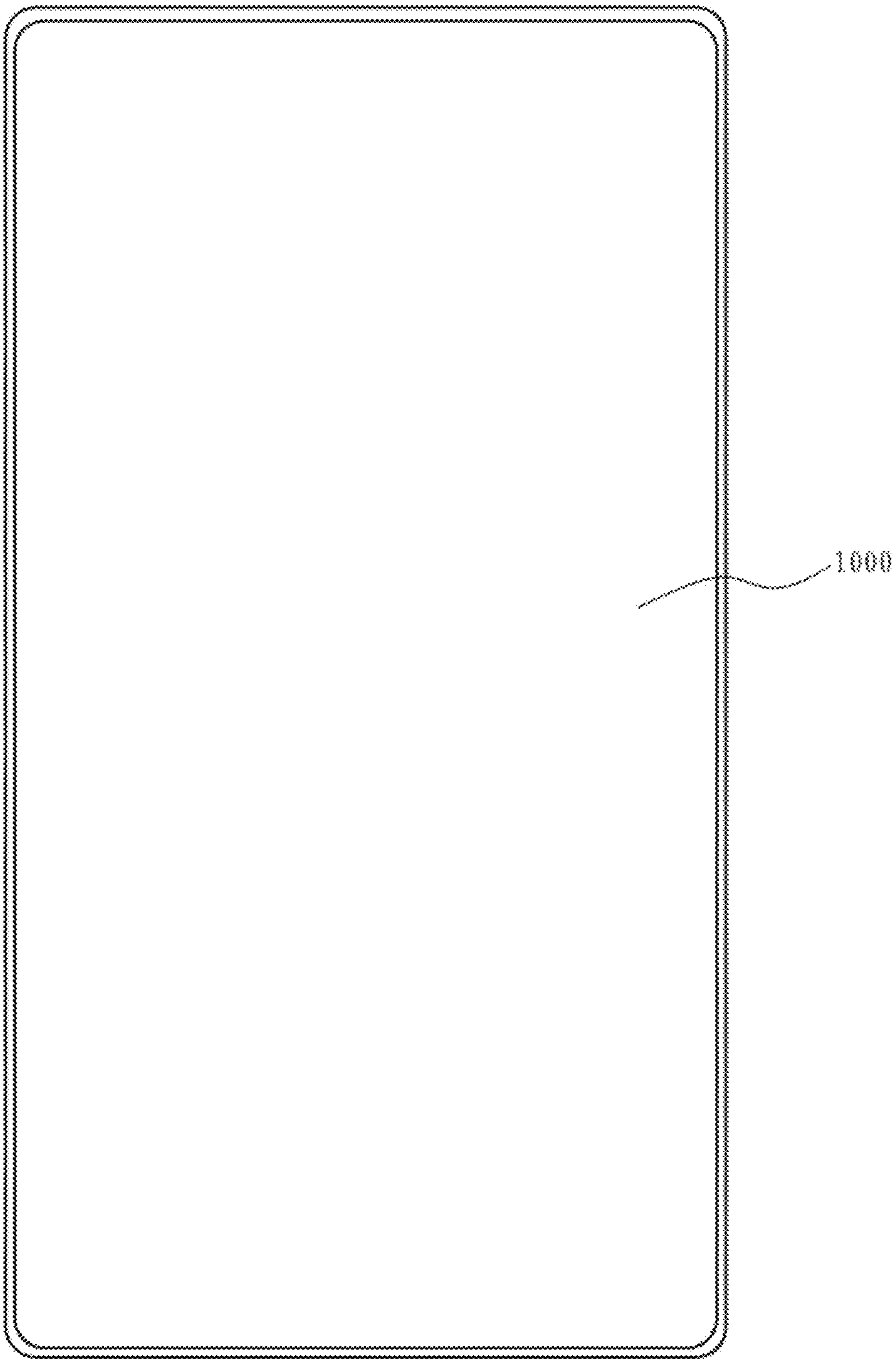
FIG. 18 is a schematic structural diagram showing a display apparatus according to an embodiment of the present disclosure.

Reference is made to FIG. 18, which is a schematic structural diagram showing the display apparatus according to an embodiment of the present disclosure. The display apparatus 1000 is a mobile terminal, in some embodiments.

It should be noted that, the display apparatus according to the embodiments of the present disclosure may be a laptop, a tablet, a computer, a wearable device or the like, which is not limited in the present disclosure.

A display panel and a display apparatus are provided according to the embodiments of the present disclosure. The display panel includes: an active area and a border area. The border area includes a chip bonding area on a first side of the active area along a first direction. The chip bonding area includes multiple data pins. Multiple multiplexers are arranged in the border area. The multiple multiplexers include at least first multiplexers arranged on a second side of the active area. The first side of the active area is opposite to the second side of the active area. An input terminal the first multiplexer is electrically connected to a first data input wire, and the first data input wire is electrically connected to the data pin through the active area.

It can be seen from the above description that, according to the embodiments provided in the present disclosure, the first multiplexers are arranged in the second side of the active area. Less wiring is arranged in the chip bonding area in the border area, and therefore the wires can be easily arranged in the chip bonding area in the border area, facilitating a narrow border of the display apparatus.

In the description of the present disclosure, it should be understood that the orientation or positional relationships indicated by terms such as "center", "longitudinal", "lateral", "length", "width", "thickness", "up", "down", "forward", "backward", "left", "right", "vertical", "horizontal", "top", "bottom", "inner", "outer", "clockwise", "anticlockwise", "axial", "radial", "circumferential" and the like are based on the orientation or positional relationships shown in the drawings, and are merely for the convenience of describing the present disclosure and simplifying the description instead of indicating or implying that the indicated apparatus or element must be arranged in a particular orientation, or be constructed and operated in a particular orientation, and therefore should not be construed as limitations on the scope of the present disclosure.

Furthermore, the terms "first" and "second" are merely for purpose of description, and should not be construed as indicating or implying relative importance or implying the number of the indicated features. Therefore, a feature defined with "first" or "second" may be at least one in number explicitly or implicitly. In the description of the present disclosure, the term "multiple/plurality of" means at least two, such as two, or three, unless clearly defined otherwise.

In the present disclosure, unless clearly specified or defined otherwise, the terms such as "arrangement", "linkage", "connection" and "fixation" should be understood in a broad sense. For example, the "connection" may be a fixed connection, a detachable connection, connection as a whole, a mechanical connection, an electrical connection, communicative connection, a direct connection, an indirect connection, an internal connection between two components or an interaction between two components, unless clearly defined otherwise. The foregoing terms in the present disclosure according to specific conditions.

In the present disclosure, a first feature "up" or "down" on a second feature may be construed as that the first feature is in direct contact with the second feature, or the first feature is in indirect contact with the second feature, unless clearly specified and defined otherwise. In one embodiment, the first feature being "on", "above" and "over" the second feature indicates that the first feature is directly above and obliquely above the second feature, or simply indicates that the first feature is higher than the second feature with reference to a horizontal line. The first feature being "below", "under" and "beneath" the second feature indicates that the first feature is directly below and obliquely below the second feature, or simply indicates that the first feature is lower than the second feature with reference to a horizontal line.

In the present disclosure, terms such as "an embodiment", "some embodiments", "example", "specific example" and "some examples", etc. indicate that specific features, structures, materials or characteristics described in conjunction with the embodiment or the example are included in at least one embodiment or example of the present disclosure. In the present disclosure, the illustrative expressions of the above terms are not necessarily limited to the same embodiment or example. Moreover, the specific features, the structures, the materials or the characteristics described may be combined in a suitable manner in one or more embodiments or examples. In addition, combination of different embodiments or examples and the features in the different embodiments or examples described in the present disclosure in case of no contradiction.

Although the embodiments of the present disclosure have been shown and described above, it should be understood that the above embodiments are illustrative and therefore should not understood as limitations on the present disclosure.

The invention claimed is:

1. A display panel, comprising:

an active area; and a border area comprising a chip bonding area arranged on a first side of the active area along a first direction, wherein a plurality of data pins are arranged in the chip bonding area; and a plurality of multiplexers are arranged in the border area, wherein the plurality of multiplexers comprises at least first multiplexers, the first multiplexers are arranged on a second side of the active area, and the first side of the active area is opposite to the second side of the active area; and input terminals of the first multiplexers are electrically connected to first data input wires, and the first data input wires are electrically connected to the plurality of data pins through the active area, respectively, wherein each of the first data input wires comprises a first data transfer wire arranged in the border area on the first side of the active area, a data connecting wire arranged in the active area and a second data transfer wire arranged in the border area on the second side of the active area; and one terminal of the first data transfer wire is electrically connected to the corresponding data pin, the other terminal of the first data transfer wire is electrically connected to one terminal of the data connecting wire, the other terminal of the data connecting wire is electrically connected to one terminal of the second data transfer wire, and the other terminal of the second data transfer wire is electrically connected to the input terminal of the corresponding first multiplexer.

2. The display panel according to claim 1, wherein the active area is provided with a first curved edge on the first side along a second direction; and no multiplexer is arranged at the first curved edge, and the first direction and the second direction intersect.

3. The display panel according to claim 1, wherein the first multiplexers are arranged in sequence along an edge of the active area.

4. The display panel according to claim 3, wherein the active area is provided with a second curved edge on the second side along the second direction; and the first multiplexers are arranged in sequence along the second curved edge, and the first direction and the second direction intersect.

5. The display panel according to claim 4, wherein a plurality of pixel rows are arranged in the active area along the first direction;

pixel gaps are formed between adjacent pixel rows at the second curved edge along the second direction, the first multiplexers are arranged at the pixel gaps, and the first direction and the second direction intersect; and the pixel gaps are divided into first pixel gaps and second pixel gaps, the first pixel gap is longer than the second pixel gap, and the first multiplexers arranged at the first pixel gap are more than or equal to the first multiplexers arranged at the second pixel gap.

6. The display panel according to claim 4, wherein a scanning drive circuit and scanning control signal wiring that extend along the first direction are arranged in the border area, the first multiplexers are arranged between the scanning drive circuit and the active area, and the scanning control signal wiring is arranged on a side of the scanning drive circuit away from the active area.

7. The display panel according to claim 4, wherein a scanning drive circuit and scanning control signal wiring that extend along the first direction are arranged in the border area, the first multiplexers are arranged between the scanning drive circuit and the active area, and the scanning control signal wiring is arranged between the scanning drive circuit and the first multiplexers; and a plurality of pixel rows are arranged in the active area along the first direction, and the scanning drive circuit is electrically connected to the plurality of pixel rows through respective scanning wires, wherein all the scanning wires intersect with and are insulated from the scanning control signal wiring in a direction perpendicular to the display panel.

8. The display panel according to claim 1, wherein the input terminals and output terminals of the first multiplexers are arranged on two sides of the first multiplexers along the first direction.

9. The display panel according to claim 1, wherein the second data transfer wire is at least partially arranged on a side of the corresponding first multiplexer away from the active area.

10. The display panel according to claim 1, wherein the first multiplexers comprise a 1st first multiplexer to an Nth first multiplexer arranged in sequence along the second direction, and the first direction and the second direction intersect; and the ith first multiplexer is connected to an ith data connecting wires among the data connecting wires and is connected to an ith data pin among the plurality of data pins, the first data connecting wire to the Nth data connecting wire are arranged in a direction opposite to a direction in which the 1st first multiplexer to the Nth first multiplexer are arranged, and the first data pin to the Nth data pin are arranged in a same direction as the 1st first multiplexer to the Nth first multiplexer, wherein N is an integer greater than or equal to two, and i is a positive integer less than or equal to N.

11. The display panel according to claim 10, wherein the ith first multiplexer is connected to an ith first data transfer wire among the first data transfer wires, and the ith first data transfer wire comprises a lead wire and a winding wire;

the lead wire of the ith first data transfer wire is electrically connected to the ith data connecting wire, and extends to a side of the corresponding data pin away from the active area; and the winding wire of the ith first data transfer wire is arranged on the side of the corresponding data pin away from the active area, two terminals of the winding wire of the ith first data transfer wire are electrically connected to the lead wire of the ith first data transfer wire and the ith data pin respectively, and the winding wires do not cross in a direction perpendicular to the display panel.

12. The display panel according to claim 10, wherein the ith first multiplexer is connected to an ith second data transfer wire among the second data transfer wires, and the 1st second data transfer wire to the Nth second data transfer wire are arranged in sequence along the first direction and do not cross in a direction perpendicular to the display panel.

13. The display panel according to claim 1, wherein the first multiplexers comprise a 1st first multiplexer to an Nth first multiplexer arranged in sequence along the second direction, and the first direction and the second direction intersect; and the ith first multiplexer is connected to an ith data connecting wires among the data connecting wires and is connected to an ith data pin among the plurality of data pins, the first data connecting wire to the Nth data connecting wire are arranged in a same direction as the 1st first multiplexer to the Nth first multiplexer, and the first data pin to the Nth data pin are arranged in the same direction as the 1st first multiplexer to the Nth first multiplexer, wherein N is an integer greater than or equal to two, and i is a positive integer less than or equal to N.

14. The display panel according to claim 13, wherein the ith first multiplexer is connected to an ith first data transfer wire among the first data transfer wires, and the ith first data transfer wire is electrically connected to the ith data pin on a side of the ith data pin toward the active area.

15. The display panel according to claim 13, wherein the ith first multiplexer is connected to an ith second data transfer wire among the second data transfer wires, and the 1st second data transfer wire to the Nth second data transfer wire are arranged in sequence along the first direction and cross in a direction perpendicular to the display panel.

16. The display panel according to claim 1, wherein a plurality of data wires are arranged in the active area and are connected to output terminals of the multiplexers, respectively; and the data connecting wires are arranged in a different layer than the plurality of data wires.

17. The display panel according to claim 1, wherein two of the first data transfer wire, the data connecting wire and the second data transfer wire are arranged in a same layer or in different layers.

18. The display panel according to claim 1, wherein the data connecting wire is narrower than at least one of the first data transfer wire and the second data transfer wire.

19. The display panel according to claim 1, further comprises a shielding signal wire:

wherein the first data input wire is at least partially arranged in a different layer than the shielding signal wire; and the first data input wire at least partially overlaps the shielding signal wire in a direction perpendicular to the display panel.

20. The display panel according to claim 19, wherein a segment of the first data input wire along a direction in which the first data input wire extends overlaps the shielding signal wire; and/or a compensation segment of the first data input wire along a direction intersecting the direction in which the first data input wire extends overlaps the shielding signal wire, wherein the compensation segment is wider than other parts of the first data input wire.

21. The display panel according to claim 1, comprising:

a substrate;

first data input wires arranged on a side of the substrate; and a plurality of light-emitting elements on a side of the first data input wire away from the substrate, wherein each of the light-emitting elements includes an anode, an emissive layer and a cathode stacked in sequence, and the first data input wires do not overlap the anode in a direction perpendicular to the display panel.

22. The display panel according to claim 1, comprising:

a substrate;

a gate metal layer arranged on a side of the substrate;

a first insulating layer arranged on a side of the gate metal layer away from the substrate;

a source-drain metal layer arranged on a side of the first insulating layer away from the substrate;

a second insulating layer arranged on a side of the source-drain metal layer away from the substrate; and a transfer metal layer arranged on a side of the second insulating layer away from the substrate, wherein the display panel further comprises:

a third insulating layer arranged between the substrate and the gate metal layer, and a transmission metal layer arranged between the third insulating layer and the substrate; or a third insulating layer arranged on a side of the transfer metal layer away from the substrate, and a transmission metal layer arranged on a side of the third insulating layer away from the substrate, wherein the first data input wire is at least partially arranged in the transmission metal layer.

23. The display panel according to claim 22, wherein the third insulating layer ranges from 5000 to 10000 angstroms in thickness.

24. The display panel according to claim 1, wherein the plurality of multiplexers comprises second multiplexers arranged between the active area and the chip bonding area; and a plurality of second data input wires are arranged in the border area between the second multiplexers and the chip bonding area, and input terminals of the second multiplexers are electrically connected to the plurality of second data input wires that are electrically connected to the plurality of the data pins, respectively.

25. The display panel according to claim 24, wherein the first data input wire is at least partially smaller than the second data input wire in sheet resistance.

26. The display panel according to claim 24, wherein the first data input wire is at least partially wider than the second data input wire.

27. A display apparatus, comprising: a display panel comprising: an active area; and a border area comprising a chip bonding area arranged on a first side of the active area along a first direction, wherein a plurality of data pins are arranged in the chip bonding area; and a plurality of multiplexers are arranged in the border area, wherein the plurality of multiplexers comprises at least first multiplexers, the first multiplexers are arranged on a second side of the active area, and the first side of the active area is opposite to the second side of the active area; and input terminals of the first multiplexers are electrically connected to first data input wires, and the first data input wires are electrically connected to the plurality of data pins through the active area, respectively, wherein each of the first data input wires comprises a first data transfer wire arranged in the border area on the first side of the active area, a data connecting wire arranged in the active area and a second data transfer wire arranged in the border area on the second side of the active area; and one terminal of the first data transfer wire is electrically connected to the corresponding data pin, the other terminal of the first data transfer wire is electrically connected to one terminal of the data connecting wire, the other terminal of the data connecting wire is electrically connected to one terminal of the second data transfer wire, and the other terminal of the second data transfer wire is electrically connected to the input terminal of the corresponding first multiplexer.

* * * * *